(12) United States Patent
Sakamoto

(10) Patent No.: US 12,083,927 B2
(45) Date of Patent: Sep. 10, 2024

(54) POWER SUPPLY SYSTEM

(71) Applicant: HONDA MOTOR CO., LTD., Tokyo (JP)

(72) Inventor: Hiroki Sakamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 17/678,023

(22) Filed: Feb. 23, 2022

(65) Prior Publication Data

US 2022/0297572 A1    Sep. 22, 2022

(30) Foreign Application Priority Data

Mar. 19, 2021  (JP) ................... 2021-046219

(51) Int. Cl.
*B60L 58/18*    (2019.01)
*B60L 58/26*    (2019.01)

(52) U.S. Cl.
CPC ............... *B60L 58/18* (2019.02); *B60L 58/26* (2019.02); *B60L 2240/545* (2013.01)

(58) Field of Classification Search
CPC ..... B60L 58/18; B60L 58/26; B60L 2240/545
See application file for complete search history.

(56) References Cited

U.S. PATENT DOCUMENTS

| | | | |
|---|---|---|---|
| 10,300,904 B2* | 5/2019 | Takizawa | B60W 10/06 |
| 11,007,900 B2* | 5/2021 | Samyn | H01M 10/625 |
| 2017/0088009 A1 | 3/2017 | Takizawa et al. | |
| 2017/0267120 A1* | 9/2017 | Takizawa | B60L 15/007 |
| 2020/0398643 A1* | 12/2020 | Miyazaki | H01M 50/204 |

FOREIGN PATENT DOCUMENTS

JP        2017070078 A      4/2017

* cited by examiner

*Primary Examiner* — Edwin A Young
(74) *Attorney, Agent, or Firm* — CKC & Partners Co., LLC

(57) ABSTRACT

A power supply system for a vehicle includes a management ECU that controls output power of first and second batteries in a normal mode or an output priority mode, a first cooler that cools the first battery, a second cooler that cools the second battery, and a cooling circuit ECU that controls first and second cooling output of the coolers. In a case where an operation mode of the management ECU is the output priority mode and the first battery has a cooling remaining-capacity, the cooling circuit ECU increases the first cooling output as compared with a case where the operation mode is the normal mode. In a case where the operation mode is the output priority mode and the second battery has a cooling remaining-capacity, the cooling circuit ECU increases the second cooling output as compared with the case where the operation mode is the normal mode.

10 Claims, 8 Drawing Sheets

FIG. 6

| | | PC1_mar / PC2_mar | WITH COOLING REMAINING-CAPACITY / WITH COOLING REMAINING-CAPACITY | WITH COOLING REMAINING-CAPACITY / NO COOLING REMAINING-CAPACITY | NO COOLING REMAINING-CAPACITY / WITH COOLING REMAINING-CAPACITY | NO COOLING REMAINING-CAPACITY / NO COOLING REMAINING-CAPACITY |
|---|---|---|---|---|---|---|
| WITH TEMPERATURE REMAINING-CAPACITY | WITH TEMPERATURE REMAINING-CAPACITY | | PRIORITY OUTPUT: FIRST BATTERY<br>FIRST COOLING MODE: ACTIVE COOLING<br>SECOND COOLING MODE: ACTIVE COOLING | PRIORITY OUTPUT: FIRST BATTERY<br>SECOND OUTPUT UPPER LIMIT: DOWN<br>FIRST COOLING MODE: ACTIVE COOLING<br>SECOND COOLING MODE: COOLING MAX | PRIORITY OUTPUT: SECOND BATTERY<br>FIRST OUTPUT UPPER LIMIT: DOWN<br>FIRST COOLING MODE: COOLING MAX<br>SECOND COOLING MODE: ACTIVE COOLING | PRIORITY OUTPUT: NONE<br>FIRST COOLING MODE: COOLING MAX<br>SECOND COOLING MODE: COOLING MAX |
| WITH TEMPERATURE REMAINING-CAPACITY | NO TEMPERATURE REMAINING-CAPACITY | | PRIORITY OUTPUT: FIRST BATTERY<br>FIRST COOLING MODE: ACTIVE COOLING<br>SECOND COOLING MODE: COOLING MAX | PRIORITY OUTPUT: FIRST BATTERY<br>SECOND OUTPUT UPPER LIMIT: DOWN<br>FIRST COOLING MODE: ACTIVE COOLING<br>SECOND COOLING MODE: COOLING MAX | PRIORITY OUTPUT: NONE<br>FIRST COOLING MODE: COOLING MAX<br>SECOND COOLING MODE: ACTIVE COOLING | PRIORITY OUTPUT: NONE<br>FIRST OUTPUT UPPER LIMIT: DOWN<br>FIRST COOLING MODE: COOLING MAX<br>SECOND COOLING MODE: COOLING MAX |
| NO TEMPERATURE REMAINING-CAPACITY | WITH TEMPERATURE REMAINING-CAPACITY | | PRIORITY OUTPUT: SECOND BATTERY<br>FIRST COOLING MODE: ACTIVE COOLING<br>SECOND COOLING MODE: ACTIVE COOLING | PRIORITY OUTPUT: NONE<br>FIRST COOLING MODE: ACTIVE COOLING<br>SECOND COOLING MODE: COOLING MAX | PRIORITY OUTPUT: SECOND BATTERY<br>FIRST OUTPUT UPPER LIMIT: DOWN<br>FIRST COOLING MODE: COOLING MAX<br>SECOND COOLING MODE: ACTIVE COOLING | PRIORITY OUTPUT: NONE<br>SECOND OUTPUT UPPER LIMIT: DOWN<br>FIRST COOLING MODE: COOLING MAX<br>SECOND COOLING MODE: COOLING MAX |
| NO TEMPERATURE REMAINING-CAPACITY | NO TEMPERATURE REMAINING-CAPACITY | | PRIORITY OUTPUT: NONE<br>FIRST COOLING MODE: ACTIVE COOLING<br>SECOND COOLING MODE: ACTIVE COOLING | PRIORITY OUTPUT: NONE<br>SECOND OUTPUT UPPER LIMIT: DOWN<br>FIRST COOLING MODE: ACTIVE COOLING<br>SECOND COOLING MODE: COOLING MAX | PRIORITY OUTPUT: NONE<br>FIRST OUTPUT UPPER LIMIT: DOWN<br>FIRST COOLING MODE: COOLING MAX<br>SECOND COOLING MODE: ACTIVE COOLING | PRIORITY OUTPUT: NONE<br>FIRST OUTPUT UPPER LIMIT: DOWN<br>SECOND OUTPUT UPPER LIMIT: DOWN<br>FIRST COOLING MODE: COOLING MAX<br>SECOND COOLING MODE: COOLING MAX |
| T1_mar | T2_mar | | | | | |

FIG. 7

| | | WITH COOLING REMAINING-CAPACITY / WITH COOLING REMAINING-CAPACITY | WITH COOLING REMAINING-CAPACITY / NO COOLING REMAINING-CAPACITY | NO COOLING REMAINING-CAPACITY / WITH COOLING REMAINING-CAPACITY | NO COOLING REMAINING-CAPACITY / NO COOLING REMAINING-CAPACITY | PC1_mar / PC2_mar |
|---|---|---|---|---|---|---|
| WITH TEMPERATURE REMAINING-CAPACITY | WITH TEMPERATURE REMAINING-CAPACITY | PRIORITY OUTPUT: ONE WITH LARGER TEMPERATURE REMAINING-CAPACITY<br>FIRST COOLING MODE: ACTIVE COOLING<br>SECOND COOLING MODE: ACTIVE COOLING | PRIORITY OUTPUT: FIRST BATTERY<br>SECOND OUTPUT UPPER LIMIT: DOWN<br>FIRST COOLING MODE: ACTIVE COOLING<br>SECOND COOLING MODE: COOLING MAX | PRIORITY OUTPUT: SECOND BATTERY<br>FIRST COOLING MODE: COOLING MAX<br>SECOND COOLING MODE: ACTIVE COOLING | PRIORITY OUTPUT: NONE<br>FIRST COOLING MODE: COOLING MAX<br>SECOND COOLING MODE: COOLING MAX | |
| WITH TEMPERATURE REMAINING-CAPACITY | NO TEMPERATURE REMAINING-CAPACITY | PRIORITY OUTPUT: FIRST BATTERY<br>FIRST COOLING MODE: ACTIVE COOLING<br>SECOND COOLING MODE: ACTIVE COOLING | PRIORITY OUTPUT: NONE<br>FIRST COOLING MODE: ACTIVE COOLING<br>SECOND COOLING MODE: COOLING MAX | PRIORITY OUTPUT: NONE<br>FIRST OUTPUT UPPER LIMIT: DOWN<br>FIRST COOLING MODE: COOLING MAX<br>SECOND COOLING MODE: ACTIVE COOLING | PRIORITY OUTPUT: NONE<br>FIRST OUTPUT UPPER LIMIT: DOWN<br>FIRST COOLING MODE: COOLING MAX<br>SECOND COOLING MODE: COOLING MAX | |
| NO TEMPERATURE REMAINING-CAPACITY | WITH TEMPERATURE REMAINING-CAPACITY | PRIORITY OUTPUT: SECOND BATTERY<br>FIRST COOLING MODE: ACTIVE COOLING<br>SECOND COOLING MODE: ACTIVE COOLING | PRIORITY OUTPUT: NONE<br>SECOND OUTPUT UPPER LIMIT: DOWN<br>FIRST COOLING MODE: ACTIVE COOLING<br>SECOND COOLING MODE: COOLING MAX | PRIORITY OUTPUT: NONE<br>FIRST COOLING MODE: COOLING MAX<br>SECOND COOLING MODE: ACTIVE COOLING | PRIORITY OUTPUT: NONE<br>FIRST OUTPUT UPPER LIMIT: DOWN<br>FIRST COOLING MODE: COOLING MAX<br>SECOND COOLING MODE: COOLING MAX | |
| NO TEMPERATURE REMAINING-CAPACITY | NO TEMPERATURE REMAINING-CAPACITY | PRIORITY OUTPUT: FIRST BATTERY<br>FIRST COOLING MODE: ACTIVE COOLING<br>SECOND COOLING MODE: COOLING MAX | PRIORITY OUTPUT: FIRST BATTERY<br>SECOND OUTPUT UPPER LIMIT: DOWN<br>FIRST COOLING MODE: ACTIVE COOLING<br>SECOND COOLING MODE: COOLING MAX | PRIORITY OUTPUT: NONE<br>FIRST OUTPUT UPPER LIMIT: DOWN<br>FIRST COOLING MODE: COOLING MAX<br>SECOND COOLING MODE: ACTIVE COOLING | PRIORITY OUTPUT: NONE<br>FIRST OUTPUT UPPER LIMIT: DOWN<br>FIRST COOLING MODE: COOLING MAX<br>SECOND COOLING MODE: COOLING MAX | |
| T1_mar | T2_mar | | | | | |

POWER SUPPLY SYSTEM

This application is based on and claims the benefit of priority from Japanese Patent Application No. 2021-046219, filed on 19 Mar. 2021, the content of which is incorporated herein by reference.

BACKGROUND OF THE INVENTION

Field of the Invention

The present invention relates to a power supply system. More specifically, the present invention relates to a power supply system including two electrical storage devices and a cooler for the electrical storage devices.

Related Art

In recent years, electric vehicles, such as electric transport equipment equipped with a drive motor as a motive power generation source and hybrid vehicles equipped with a drive motor and an internal combustion engine as motive power generation sources, have been developed actively. Such an electric vehicle also includes thereon an electrical accumulator (e.g., a battery or a capacitor) for supplying electrical energy to the drive motor. Recently, electric vehicles equipped with a plurality of electrical accumulators with different characteristics have also been developed.

For example, Japanese Unexamined Patent Application, Publication No. 2017-70078 discloses a power supply system for an electric vehicle. This power supply system includes a capacitance type battery and an output type battery that are connected to a drive motor via a power circuit. The power supply system including two batteries with different characteristics as described above allows the vehicle to travel in various operation modes including, for example, a normal mode and an output priority mode. In the normal mode, the vehicle travels by power outputted from the capacitance type battery. In the output priority mode, which is performed when the vehicle requires high output and the power outputted from the capacitance type battery alone is insufficient, power is outputted from the output type battery so as to compensate for the insufficient power.

Patent Document 1: Japanese Unexamined Patent Application, Publication No. 2017-70078

SUMMARY OF THE INVENTION

Meanwhile, charging/discharging a battery in a high temperature state may promote degradation of the battery. For this reason, as disclosed in Japanese Unexamined Patent Application, Publication No. 2017-70078, many power supply systems are provided with a cooling circuit that cools the battery and maintains the battery at an appropriate temperature. However, with respect to the power supply system that allows a vehicle to travel in a plurality of operation modes, how to specifically change the cooling methods according to the operation modes has not been sufficiently considered.

An object of the present invention is to provide a power supply system capable of driving a rotary electrical machine in a plurality of operation modes using two electrical storage devices and maintaining each of the electrical storage devices in a state suitable for the operation mode.

(1) A power supply system (for example, a power supply system 1 described later) according to the present invention includes: a first electrical storage device (for example, a first battery B1 described later); a second electrical storage device (for example, a second battery B2 described later); a load circuit (for example, a load circuit 4 described later) including a rotary electrical machine (for example, a drive motor M described later); a power circuit (for example, a first power circuit 2 and a second power circuit 3 described later) that connects the first and second electrical storage devices to the load circuit; a power controller (for example, a management ECU 71, a motor ECU 72, and a converter ECU 73 described later) that controls a first output power of the first electrical storage device and a second output power of the second electrical storage device in a normal mode or an output priority mode that allows an output, which is larger than that in the normal mode, from the power circuit to the load circuit; a first cooler (for example, a first cooler 91 described later) that cools the first electrical storage device; a second cooler (for example, a second cooler 92 described later) that cools the second electrical storage device; and a cooling output controller (for example, a cooling circuit ECU 76 described later) that controls a first cooling output of the first cooler and a second cooling output of the second cooler, the power supply system further including a cooling remaining-capacity acquirer (for example, a cooling circuit ECU 76 described later) that acquires a first cooling remaining-capacity (for example, a first cooling remaining-capacity PC1_mar described later) increasing or decreasing depending on a difference between a first maximum cooling output and the first cooling output of the first cooler and a second cooling remaining-capacity (for example, a second cooling remaining-capacity PC2_mar described later) increasing or decreasing depending on a difference between a second maximum cooling output and the second cooling output of the second cooler. The cooling output controller is configured such that: in a case where an operation mode of the power controller is the output priority mode and the first cooling remaining-capacity is equal to or more than a first cooling remaining-capacity threshold value, the cooling output controller increases the first cooling output as compared with a case where the operation mode is the normal mode; in a case where the operation mode is the output priority mode and the second cooling remaining-capacity is equal to or more than a second cooling remaining-capacity threshold value, the cooling output controller increases the second cooling output as compared with a case where the operation mode is the normal mode.

(2) In this case, preferably, the power supply system further includes: a temperature acquirer (for example, a first battery ECU 74, a second battery ECU 75, a first battery sensor unit 81, and a second battery sensor unit 82 described later) that acquires a first temperature of the first electrical storage device and a second temperature of the second electrical storage device; and a temperature remaining-capacity acquirer (for example, a first battery ECU 74, a second battery ECU 75, a first battery sensor unit 81, and a second battery sensor unit 82 described later) that acquires a first temperature remaining-capacity (for example, a first temperature remaining-capacity T1_mar described later) increasing or decreasing depending on a difference between a first upper limit temperature and the first temperature of the first electrical storage device and a second temperature remaining-capacity (for example, a second temperature remaining-capacity T2_mar described later) increasing or decreasing depending on a difference between a second upper limit temperature and the second temperature of the second electrical storage device, wherein the power controller controls the first output power and the second output power based on the first and second cooling remaining-capacities and the first and second temperature remaining-capacities.

(3) In this case, preferably, in a case where the first cooling remaining-capacity is equal to or more than the first cooling remaining-capacity threshold value and the first temperature remaining-capacity is equal to or more than a first temperature remaining-capacity threshold value, the power controller increases the first output power as compared with a case where the first cooling remaining-capacity or the first temperature remaining-capacity is less than the first cooling remaining-capacity threshold value or the first temperature remaining-capacity threshold value; wherein in a case where the second cooling remaining-capacity is equal to or more than the second cooling remaining-capacity threshold value and the second temperature remaining-capacity is equal to or more than a second temperature remaining-capacity threshold value, the power controller increases the second output power as compared with a case where the second cooling remaining-capacity or the second temperature remaining-capacity is less than the second cooling remaining-capacity threshold value or the second temperature remaining-capacity threshold value.

(4) In this case, it is preferable that: the cooling output controller increases the first cooling output to the first maximum cooling output in a case where the first cooling remaining-capacity is less than the first cooling remaining-capacity threshold value; and the cooling output controller increases the second cooling output to the second maximum cooling output in a case where the second cooling remaining-capacity is less than the second cooling remaining-capacity threshold value. It is also preferable that: in a case where the first cooling remaining-capacity is less than the first cooling remaining-capacity threshold value and the first temperature remaining-capacity is less than the first temperature remaining-capacity threshold value, the power controller reduces the first output power as compared with the case where the first cooling remaining-capacity or the first temperature remaining-capacity is equal to or more than the first cooling remaining-capacity threshold value or the first temperature remaining-capacity threshold value; and in a case where the second cooling remaining-capacity is less than the second cooling remaining-capacity threshold value and the second temperature remaining-capacity is less than the second temperature remaining-capacity threshold value, the power controller reduces the second output power as compared with the case where the second cooling remaining-capacity or the second temperature remaining-capacity is equal to or more than the second cooling remaining-capacity threshold value or the second temperature remaining-capacity threshold value.

(5) In this case, preferably, the temperature remaining-capacity acquirer calculates the first temperature remaining-capacity based on a first temperature difference between the first upper limit temperature and the first temperature and a first heat capacity of the first electrical storage device, and calculates the second temperature remaining-capacity based on a second temperature difference between the second upper limit temperature and the second temperature and a second heat capacity of the second electrical storage device.

(6) In this case, preferably, the power controller preferentially causes the first or second electrical storage device having either larger one of the first temperature remaining-capacity and the second temperature remaining-capacity to output power in a case where the first and second cooling remaining-capacities are equal to or more than the first and second cooling remaining-capacity threshold values, respectively, and the first and second temperature remaining-capacities are equal to or more than the first and second temperature remaining-capacity threshold values, respectively.

(7) in this case, preferably, the first electrical storage device has a larger heat capacity than the second electrical storage device, and the power controller causes the first electrical storage device to output power in preference to the second electrical storage device in a case where the first and second cooling remaining-capacities are equal to or more than the first and second cooling remaining-capacity threshold values, respectively, and the first and second temperature remaining-capacities are equal to or more than the first and second temperature remaining-capacity threshold values, respectively.

(1) In the present invention, the power controller controls the output power of the first and second electrical storage devices in the normal mode or the output priority mode that allows the larger output than the normal mode, the cooling output controller controls the first and second cooling outputs by the first and second coolers, and the cooling remaining-capacity acquirer acquires the first and second cooling remaining-capacities that increase and decrease depending on the difference between the first and second maximum cooling outputs and the first and second cooling outputs of the first and second coolers. Further, when the operation mode is the output priority mode and the first cooling remaining-capacity is equal to or more than the first cooling remaining-capacity threshold value, the cooling output controller increases the first cooling output as compared with the case where the operation mode is the normal mode, and in the case where the operation mode is the output priority mode and the second cooling remaining-capacity is equal to or more than the second cooling remaining-capacity threshold value, the cooling output controller increases the second cooling output as compared with the case where the operation mode is the normal mode. Here, when the operation mode is the output priority mode, the output of each of the electrical storage devices tends to become large, and therefore the amount of heat generated tends to increase. Therefore, in the present invention, when each of the coolers has the large cooling remaining-capacity, that is, when there is room for increasing the cooling output, the cooling output is increased in anticipation of an increase in the amount of heat generated by each of the electrical storage devices. Thus, in the output priority mode, each of the electrical storage devices can be maintained at an appropriate temperature such that the output can be increased promptly in response to the request. Further, thereby, it is possible to reduce the situation where the temperature of each of the electrical storage devices rises excessively and the output thereof is limited.

(2) In the present invention, the power controller controls the first output power and the second output power based on the first and second cooling remaining-capacities and the first and second temperature remaining-capacities. Thus, the first output power and the second output power can be controlled to an appropriate size in anticipation of room for an increase the cooling output of each of the coolers.

(3) In the present invention, when the operation mode is the output mode and the cooling remaining-capacities are equal to or more than the cooling remaining-capacity threshold values, respectively, the cooling output controller increases the cooling output as compared with the case where the operation mode is the normal mode as described above. Further, when the cooling remaining-capacities are equal to or more than the cooling remaining-capacity threshold values, respectively and the temperature remaining-capacities are equal to or more than the temperature remaining-capacity threshold values, respectively, the power controller increases each output power as compared with a case where the cooling remaining-capacities or the temperature remaining-capacities are less than the cooling remaining-capacity threshold values or the temperature remaining-capacity threshold values, respectively. Thus, it is possible to inhibit an excessive temperature rise of each of the electrical storage devices while increasing the output power of each of the electrical storage devices.

(4) In the present invention, the cooling output controller increases each of the cooling outputs to each of the maximum cooling outputs when the cooling remaining-capacities are less than the cooling remaining-capacity threshold values, respectively, and the power controller reduces each of the output power when the cooling remaining-capacities are less than the cooling remaining-capacity threshold values and the temperature remaining-capacities are less than the temperature remaining-capacity threshold values, respectively, as compared with a case where the cooling remaining-capacities or the temperature remaining-capacities are equal to or more than the cooling remaining-capacity threshold values or the temperature remaining-capacity threshold values, respectively. Thereby, the temperature drop of each of the electrical storage devices can be promoted such that the output power of each of the electrical storage devices can be increased again.

(5) In the present invention, the temperature acquirer calculates each of the temperature remaining-capacities, based on the temperature difference and the heat capacity of each of the electrical storage devices. Thus, the power controller can control the output power of each of the electrical storage devices to an appropriate size while preventing the excessive temperature rise of each of the electrical storage devices in consideration of the heat capacity of each of the electrical storage devices.

(6) In the present invention, when the cooling remaining-capacities are equal to or more than the cooling remaining-capacity threshold values, respectively, and the temperature remaining-capacities are equal to or more than temperature remaining-capacity threshold values, respectively, the power controller preferentially causes the electrical storage device to output power, the electrical storage device having either larger one of the temperature remaining-capacities calculated in consideration of the heat capacity as described above. Thereby, it is possible to control the output power of each of the electrical storage devices to an appropriate size while preventing an excessive temperature rise of each of the electrical storage devices.

(7) In the present invention, when the cooling remaining-capacities are equal to or more than the cooling remaining-capacity threshold values, respectively, and the temperature remaining-capacities are equal to or more than temperature remaining-capacity threshold values, respectively, the power controller causes the first electrical storage device having a relatively large heat capacity to output power in preference to the second electrical storage device having a relatively small heat capacity. Thereby, it is possible to control the output power of each of the electrical storage devices to an appropriate size while preventing an excessive temperature rise of each of the electrical storage devices.

BRIEF DESCRIPTION OF THE DRAWINGS

FIG. 6 shows an example of an operation table for determining an output and a cooling mode of a battery based on a temperature remaining-capacity and a cooling remaining-capacity; and FIG. 7 shows an example of an operation table of a power supply system according to a second embodiment of the present invention.

DETAILED DESCRIPTION OF THE INVENTION

First Embodiment

Figure 1:
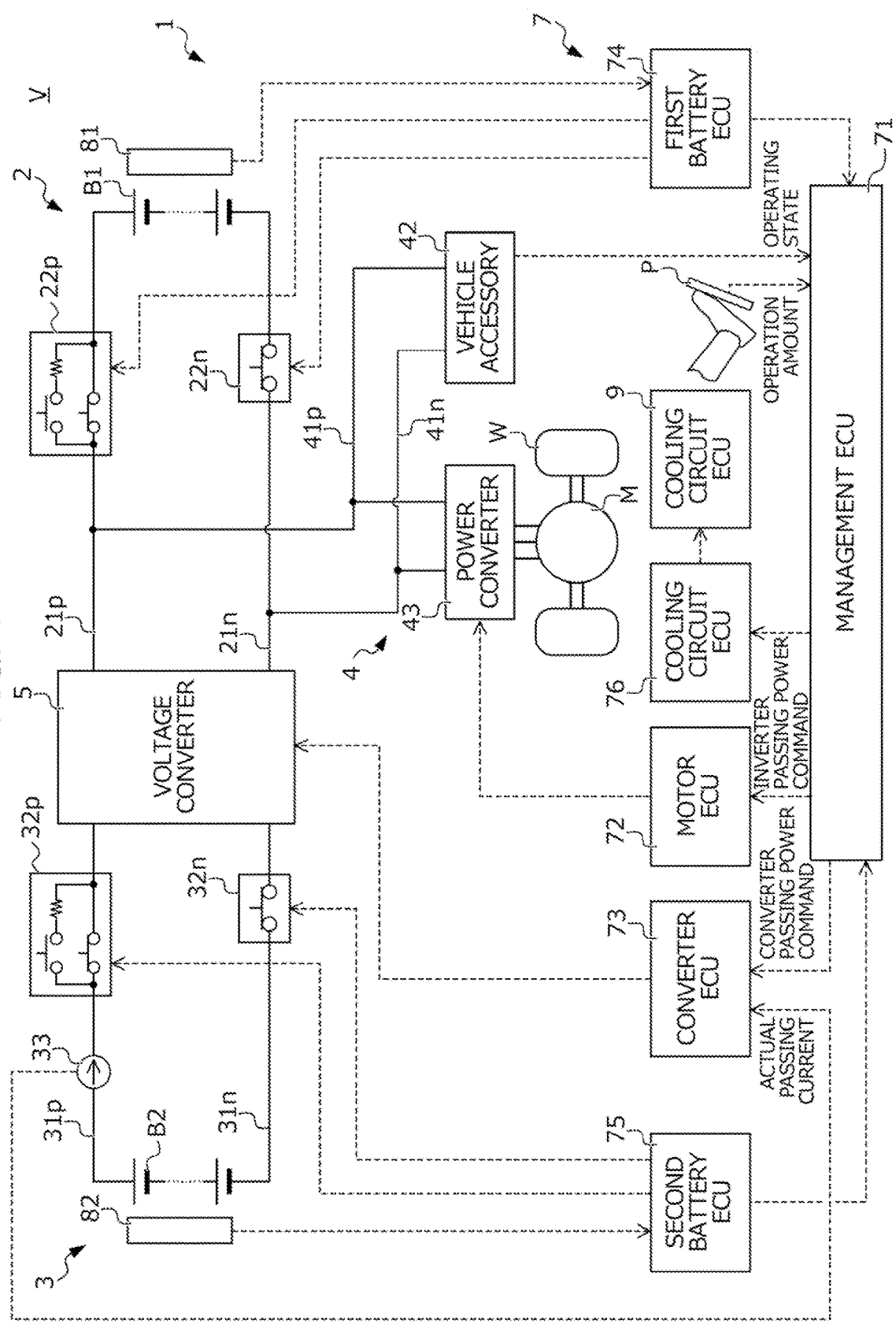
FIG. 1 is a diagram showing the configuration of a vehicle equipped with a power supply system according to a first embodiment of the present invention.

A first embodiment of the present invention will be described with reference to the drawings. FIG. 1 is a diagram showing the configuration of a four-wheeled electric vehicle V (hereinafter simply referred as "vehicle") mounted with a power supply system 1 according to the present embodiment. In the present embodiment, a case will be described where the power supply system 1 is mounted on the four-wheeled vehicle V, but the present invention is not limited thereto. The power supply system according to the present invention may be applied to not only the four-wheeled vehicle V, but also mobile bodies such as a saddled vehicle, a ship, a robot, and an unmanned aircraft which move by a propulsive force generated by a rotary electrical machine, and a stationary power source.

The vehicle V includes drive wheels W, a drive motor M as a rotary electrical machine coupled to the drive wheels W; and the power supply system 1 which transfers power between the drive motor M and a first battery B1 and a second battery B2 described later. It should be noted that the present embodiment will be described based on an example in which the vehicle V accelerates and decelerates with the motive power generated mainly by the drive motor M; however, the present invention is not to be limited thereto. The vehicle V may be configured as a so-called hybrid vehicle equipped with the drive motor M and an engine as the motive power generation source.

The drive motor M is coupled to the drive wheels W via a power transmission mechanism (not shown). The drive motor M generates torque by receiving three-phase alternating current power supplied from the power supply system 1. The generated torque is transmitted to the drive wheels W via the power transmission mechanism (not shown) to cause the drive wheel W to rotate and the vehicle V to move. In addition, the drive motor M performs a function of a generator during deceleration of the vehicle V, generates regenerative electric power, and provides the drive wheels W with regenerative braking torque corresponding to the magnitude of the regenerative electric power. The regenerative electric power generated by the drive motor M is charged to the batteries B1, B2 of the power supply system 1 as appropriate.

The power supply system 1 includes a first power circuit 2 to which the first battery B1 is connected, a second power circuit 3 to which the second battery B2 is connected, a voltage converter 5 which connects the first power circuit 2 to the second power circuit 3, a load circuit 4 including various electrical loads including the drive motor M, a cooling circuit 9 for cooling the first battery B1 and the second battery B2, and an electronic control unit group 7 which controls, for example, flow of power in the power circuits 2, 3, and 4, charging/discharging of the batteries B1 and B2, and cooling output of the cooling circuit 9 by operating the power circuits 2, 3, and 4, the cooling circuit 9, and the voltage converter 5. The electronic control unit group 7 includes a management ECU 71, a motor ECU 72, a converter ECU 73, a first battery ECU 74, a second battery ECU 75, and a cooling circuit ECU 76 which are each a computer.

The first battery B1 is a secondary battery capable of both discharging which converts chemical energy into electrical energy, and charging which converts the electrical energy into chemical energy. In the following, a case is described in which a so-called lithium-ion storage battery which performs charging/discharging by means of lithium ions moving between electrodes is employed as the first battery B1; however, the present invention is not limited thereto.

The first battery B1 is provided with a first battery sensor unit 81 for estimating an internal state of the first battery B1. The first battery sensor unit 81 includes a plurality of sensors that detect physical quantities required for the first battery ECU 74 to acquire a charge rate of the first battery B1 (an amount of electricity stored in the battery expressed as a percentage) corresponding to a battery level of the first battery B1 and a temperature of the first battery B1. The plurality of sensors transmit signals corresponding to the detection values to the first battery ECU 74. More specifically, the first battery sensor unit 81 includes, for example, a voltage sensor that detects a terminal voltage of the first battery B1, a current sensor that detects an electrical current flowing in the first battery B1, and a temperature sensor that detects a temperature of the first battery B1.

The second battery B2 is a secondary battery capable of both discharging that converts chemical energy into electrical energy, and charging that converts electrical energy into chemical energy. In the following, a case is described in which a so-called lithium-ion battery which performs charging/discharging by way of lithium ions moving between electrodes is employed as the second battery B2; however, the present invention is not limited thereto. The second battery B2 may be configured as, for example, a capacitor.

The second battery B2 is provided with a second battery sensor unit 82 for estimating an internal state of the second battery B2. The second battery sensor unit 82 includes a plurality of sensors that detect physical quantities required for the second battery ECU 75 to acquire a charge rate, a temperature, etc. of the second battery B2. The plurality of sensors transmit signals corresponding to the detection values to the second battery ECU 75. More specifically, the second battery sensor unit 82 include, for example, a voltage sensor that detects a terminal voltage of the second battery B2, a current sensor that detects an electrical current flowing in the second battery B2, and a temperature sensor that detects a temperature of the second battery B2.

Here, the characteristics of the first battery B1 are compared with the characteristics of the second battery B2. The first battery B1 has a lower output-weight density and a higher energy-weight density than the second battery B2. In addition, the first battery B1 has a larger discharge capacity than the second battery B2. In other words, the first battery B1 is superior to the second battery B2 in terms of energy weight density. The energy-weight density refers to an amount of electric power per unit weight (Wh/kg), and the output-weight density refers to electric power per unit weight (W/kg). Therefore, the first battery B1 that excels in the energy-weight density is a capacitance-type accumulator with high capacity as its main purpose, whereas the second battery B2 that excels in output-weight density is an output-type accumulator with high output as its main purpose. For this reason, the power supply system 1 uses the first battery B1 as the main power source, and uses the second battery B2 as an auxiliary power source which supplements the first battery B1. Further, the first battery B1 has a larger heat capacity than the second battery B2. Therefore, the temperature of the first battery B1 rises more gently than that of the second battery B2.

The first power circuit 2 includes: the first battery B1, first power lines 21$p$ and 21$n$ which connect a positive electrode and a negative electrode of the first battery B1 to a positive terminal and a negative terminal of a high-voltage side of the voltage converter 5, and a positive contactor 22$p$ and a negative contactor 22$n$ provided to the first power lines 21$p$, 21$n$.

The contactors 22$p$, 22$n$ are of a normal open type which open in a state in which a command signal from outside is not being inputted and electrically disconnect both electrodes of the first battery B1 from the first power lines 21$p$, 21$n$, and which close in a state in which a command signal is being inputted and connect the first battery B1 to the first power lines 21$p$, 21$n$. The contactors 22$p$, 22$n$ open/close in response to a command signal transmitted from the first battery ECU 74. The positive contactor 22$p$ is a pre-charge contactor having a pre-charge resistance for reducing an inrush current to a plurality of smoothing capacitors provided to the first power circuit 2, the load circuit 4, etc.

The second power circuit 3 includes: the second battery B2, second power lines 31$p$, 31$n$ which connect a positive electrode and a negative electrode of the second battery B2 to a positive terminal and a negative terminal of a low-voltage side of the voltage converter 5, a positive contactor 32$p$ and a negative contactor 32$n$ provided to the second power lines 31$p$, 31$n$, and a current sensor 33 provided to the second power line 31$p$.

The contactors 32$p$, 32$n$ are of a normal-open type which open in a state in which a command signal from outside is not being inputted and electrically disconnect both electrodes of the second battery B2 from the second power lines 31$p$, 31$n$, and which close in a state in which a command signal is being inputted and connect between the second battery B2 and the second power lines 31$p$, 31$n$. The contactors 32$p$, 32$n$ open/close in response to a command signal transmitted from the second battery ECU 75. The positive contactor 32$p$ is a pre-charge contactor having a pre-charge resistance for reducing an inrush current to a plurality of smoothing capacitors provided to the first power circuit 2, the load circuit 4, etc.

The electric current sensor 33 transmits, to the converter ECU 73, a detection signal corresponding to a value of a passing current, which is the electrical current flowing through the second power line 31$p$, i.e., the electrical current flowing through the voltage converter 5. It should be noted that, in the present embodiment, a direction of the passing current from the second power circuit 3 to the first power circuit 2 is defined as a positive, and a direction of the passing current from the first power circuit 2 to the second power circuit 3 is defined as a negative. In other words, the passing current that passes through the voltage converter 5 becomes positive when the second battery B2 discharges, and becomes negative when the second battery B2 is charged.

The load circuit 4 includes: a vehicle accessory 42, the power converter 43 to which the drive motor M is connected, and load power lines 41p, 41n which connect the vehicle accessory 42 and power converter 43 to the first power circuit 2.

The vehicle accessory 42 is constituted by a plurality of electrical loads, such as a battery heater, an air compressor, a DC-DC converter, and an onboard charger. The vehicle accessory 42 is connected to the first power lines 21p, 21n of the first power circuit 2 via the load power lines 41p, 41n, and operates by consuming the electric power of the first power lines 21p, 21n. The information regarding operating states of the various electrical loads constituting the vehicle accessory 42 is transmitted to, for example, the management ECU 71.

The power converter 43 is connected, via the load power lines 41p, 41n, to the first power lines 21p, 21n parallel with the vehicle accessory 42. The power converter 43 converts the electric power between the first power lines 21p, 21n and the drive motor M. The power converter 43 is, for example, a PWM inverter based on pulse width modulation and provided with a bridge circuit constituted by a plurality of switching elements (e.g., IGBTs) that are bridge connected, and has a function of performing conversion between DC power and AC power. The power converter 43 has a DC I/O side connected to the first power lines 21p, 21n, an AC I/O side connected to each coil of the U phase, V phase and W phase of the drive motor M. The power converter 43 converts the DC power of the first power lines 21p, 21n into three-phase AC power and supplies it to the drive motor M, and converts the three-phase AC power supplied from the drive motor M into DC power and supplies it to the first power lines 21p, 21n, by ON/OFF driving the switching elements of the respective phases in accordance with a gate drive signal generated at a predetermined timing by a gate drive circuit (not shown) of the motor ECU 72.

The voltage converter 5 connects the first power circuit 2 to second power circuit 3, and converts the voltage between the circuits 2, 3. The voltage converter 5 includes a known boost circuit.

Figure 2:
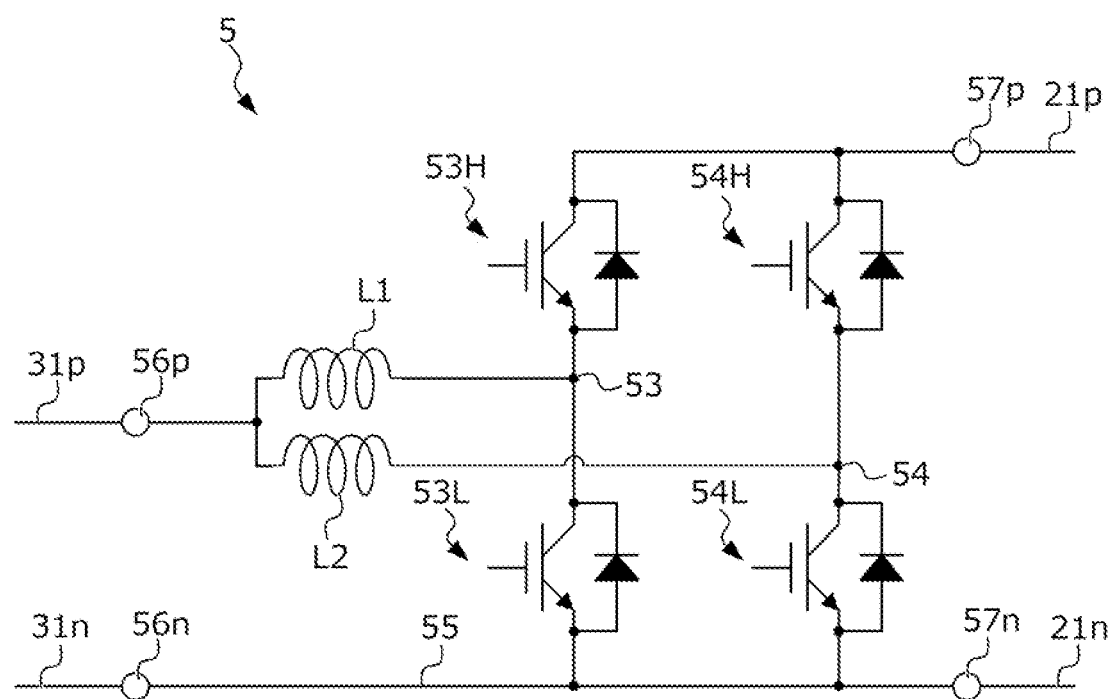
FIG. 2 is a diagram showing an example of the circuit configuration of a voltage converter.

FIG. 2 is a diagram showing an example of the circuit configuration of the voltage converter 5. The voltage converter 5 connects the first power lines 21p, 21n to which the first battery B1 is connected, to the second power lines 31p, 31n to which the second battery B2 is connected, and converts the voltage between the first power lines 21p, 21n and the second power lines 31p, 31n. The voltage converter 5 is a full-bridge DC-DC converter configured by combining a first reactor L1, a second reactor L2, a first high-arm element 53H, a first low-arm element 53L, a second high-arm element 54H, a second low-arm element 54L, a negative bus 55, low-voltage side terminals 56p, 56n, high-voltage side terminals 57p, 57n, and a smoothing capacitor (not shown).

The low-voltage side terminals 56p, 56n are connected to the second power lines 31p, 31n, and the high-voltage side terminals 57p, 57n are connected to the first power lines 21p, 21n. The negative bus 55 is wiring connecting the low-voltage side terminal 56n to the high-voltage side terminal 57n.

The first reactor L1 has one end connected to the low-voltage side terminal 56p, and the other end connected to a connection node 53 between the first high-arm element 53H and the first low-arm element 53L. The first high-arm element 53H and the first low-arm element 53L each include a known power switching element such as an IGBT or a MOSFET, and a freewheeling diode connected to the power switching element. The high-arm element 53H and the low-arm element 53L are connected in this order in series between the high-voltage side terminal 57p and the negative bus 55.

A collector of the power switching element of the first high-arm element 53H is connected to the high-voltage side terminal 57p, and the emitter thereof is connected to a collector of the first low-arm element 53L. An emitter of the power switching element of the first low-arm element 53L is connected to the negative bus 55. The forward direction of the freewheeling diode provided to the first high-arm element 53H is a direction from the first reactor L1 towards the high-voltage side terminal 57p. The forward direction of the freewheeling diode provided to the first low-arm element 53L is a direction from the negative bus 55 towards the first reactor L1.

The second reactor L2 has one end connected to the low-voltage side terminal 56p, and the other end connected to a connection node 54 between the second high-arm element 54H and second low-arm element 54L. The second high-arm element 54H and the second low-arm element 54L each include a known power switching element such as an IGBT or a MOSFET, and a freewheeling diode connected to the power switching element. The high-arm element 54H and the low-arm element 54L are connected in this order in series between the high-voltage side terminal 57p and the negative bus 55.

A collector of the power switching element of the second high-arm element 54H is connected to the high-voltage side terminal 57p, and the emitter thereof is connected to the collector of the second low-arm element 54L. An emitter of the power switching element of the second low-arm element 54L is connected to the negative bus 55. The forward direction of the freewheeling diode provided to the second high-arm element 54H is a direction from the second reactor L2 towards the high-voltage side terminal 57p. The forward direction of the freewheeling diode provided to the second low-arm element 54L is a direction from the negative bus 55 towards the second reactor L2.

The voltage converter 5 converts the voltage between the first power lines 21p, 21n and the second power lines 31p, 31n, by alternately driving ON/OFF the first high-arm element 53H and second low-arm element 54L, and the first low-arm element 53L and second high-arm element 54H, in accordance with the gate drive signal generated at a predetermined timing by a gate drive circuit (not shown) of the converter ECU 73.

The static voltage of the second battery B2 is basically maintained lower than the static voltage of the first battery B1. Therefore, the voltage of the first power lines 21p, 21n is basically higher than the voltage of the second power lines 31p, 31n. Therefore, in a case of driving the drive motor M using both the power outputted from the first battery B1 and the power outputted from the second battery B2, the converter ECU 73 operates the voltage converter 5 to cause the voltage converter 5 perform a boost function. The boost function refers to a function of stepping up the power of the second power lines 31p, 31n to which the low-voltage side terminals 56p, 56n are connected, and outputting the power to the first power lines 21p, 21n to which the high-voltage side terminals 57p, 57n are connected, whereby a positive passing current flows from the second power lines 31p, 31n side to the first power lines 21p, 21n side. In a case where discharge of the second battery B2 is to be reduced and the drive motor M is to be driven by only the power outputted from the first battery B1, the converter ECU 73 turns off the voltage converter 5 and prevents the current from flowing from the first power lines 21p, 21n to the second power lines 31p, 31n.

In a case where the first battery B1 and/or the second battery B2 is to be charged with the regenerative electric power outputted from the drive motor M to the first power lines 21p, 21n during deceleration, the converter ECU 73 operates the voltage converter 5 to cause the voltage converter 5 to perform a step-down function. The step-down function refers to a function of stepping down the electric power in the first power lines 21p, 21n to which the high-voltage side terminals 57p, 57n are connected, and outputting the power to the second power lines 31p, 31n to which the low-voltage side terminals 56p, 56n are connected, whereby a negative passing current flows from the first power lines 21p, 21n side to the second power lines 31p, 31n side.

Referring back to FIG. 1, the first battery ECU 74 is a computer mainly responsible for monitoring the state of the first battery B1 and for the open/close operation of the contactors 22p, 22n of the first power circuit 2. The first battery ECU 74 calculates, based on a known algorithm using the detection value transmitted from the first battery sensor unit 81, various parameters representing the internal state of the first battery B1, namely, the temperature of the first battery B1 (hereinafter, also referred to as "first battery temperature"), the internal resistance of the first battery B1, the static voltage of the first battery B1, the closed circuit voltage of the first battery B1, the first output upper limit corresponding to the upper limit of the power that can be outputted from the first battery B1, a first SOC corresponding to the charge rate of the first battery B1, a first temperature remaining-capacity of the first battery B1, etc. The information regarding the parameters representing the internal state of the first battery B1 acquired by the first battery ECU 74 is transmitted to the management ECU 71, for example.

Here, the first temperature remaining-capacity is a parameter indicating a margin relating to the temperature of the first battery B1. More specifically, the first temperature remaining-capacity is defined as a parameter that increases or decreases depending on the difference between a first battery upper limit temperature that is the upper limit of an operating temperature range of the first battery B1, and the first battery temperature. The first battery ECU 74 calculates the first temperature remaining-capacity by subtracting the first battery temperature from the predetermined first battery upper limit temperature. Therefore, the first temperature remaining-capacity decreases as the first battery temperature rises and approaches the first battery upper limit temperature.

The second battery ECU 75 is a computer mainly responsible for monitoring the state of the second battery B2 and for open/close operation of the contactors 32p, 32n of the second power circuit 3. The second battery ECU 75 calculates, based on a known algorithm using the detection value sent from the second battery sensor unit 82, various parameters representing the internal state of the second battery B2, namely, the temperature of the second battery B2 (hereinafter, also referred to as "second battery temperature"), the internal resistance of the second battery B2, the static voltage of the second battery B2, the closed circuit voltage of the second battery B2, the second output upper limit corresponding to the upper limit of the power that can be outputted from the second battery B2, a second SOC corresponding to the charge rate of the second battery B2, a second temperature remaining-capacity of the second battery B2, etc. The information regarding the parameters representing the internal state of the second battery B2 acquired by the second battery ECU 75 is transmitted to the management ECU 71, for example.

Here, the second temperature remaining-capacity is a parameter indicating a margin relating to the temperature of the second battery B2. More specifically, the second temperature remaining-capacity is defined as a parameter that increases or decreases depending on the difference between a second battery upper limit temperature that is the upper limit of an operating temperature range of the second battery 82, and the second battery temperature. The second battery ECU 75 calculates the second temperature remaining-capacity by subtracting the second battery temperature from the predetermined second battery upper limit temperature. Therefore, the second temperature remaining-capacity decreases as the second battery temperature rises and approaches the second battery upper limit temperature.

Charging/discharging a battery in a high temperature state may promote degradation of the battery. For this reason, the first output upper limit of the first battery B1 and the second output upper limit of the second battery B2 are set so that they decrease as the temperatures of the batteries increase.

The management ECU 71 is a computer that mainly manages the flow of electric power in the overall power supply system 1. The management ECU 71 generates an inverter passing power command signal corresponding to a command related to inverter passing power, which is passing through the power converter 43, and a converter passing power command signal corresponding to a command related to converter passing power, which is passing through the converter 5, by executing the power management processing to be described later with reference to FIG. 4.

The motor ECU 72 is a computer that mainly operates the power converter 43, and controls the flow of power between the first power circuit 2 and the drive motor M, that is, the flow of the inverter passing power. In the following, the inverter passing power is defined as a positive when the power flows from the first power circuit 2 to the drive motor M, that is, when the drive motor M is in power driving. Further, the inverter passing power is defined as a negative when the power flows from the drive motor M to the first power circuit 2, that is, when the drive motor M is in regenerative driving. In response to the inverter passing power command signal transmitted from the management ECU 71, the motor ECU 72 operates the power converter 43 so that the inverter passing power according to the command passes through the power converter 43, that is, the torque according to the inverter passing power is generated by the drive motor M.

The converter ECU 73 is a computer that mainly operates the voltage converter 5, and controls the flow of power between the first power circuit 2 and the second power circuit 3, that is, the flow of the converter passing power. In the following, the converter passing power is defined as a positive when the power flows from the second power circuit 3 to the first power circuit 2, that is, when the second battery B2 discharges and supplies power to the first power circuit 2. The converter passing power is defined as a negative when the power flows from the first power circuit 2 to the second power circuit 3, that is, when the second battery B2 is charged with power from the first power circuit 2. In response to the converter passing power command signal transmitted from the management ECU 71, the converter ECU 73 operates the voltage converter 5 so that the converter passing power according to the command passes through the voltage converter 5. More specifically, the converter ECU 73 calculates, based on the converter passing power command signal, a target current that is a target for the passing current in the voltage converter 5, and operates the voltage converter 5 according to a known feedback control algorithm so that a passing current (hereinafter also referred to as an "actual passing current") detected by the current sensor 33 becomes equal to the target current.

As described above, in the power supply system 1, the management ECU 71, the motor ECU 72, and the converter ECU 73 operate the voltage converter 5 and the power converter 43 to control the passing power in the voltage converter 5 and the passing power in the power converter 43, thereby enabling control of first battery output power which is the output power of the first battery B1 and second battery output power which is the output power of the second battery B2. Accordingly, in the present embodiment, the management ECU 71, the motor ECU 72, and the converter ECU 73 constitute a power controller for controlling the first battery output power and the second battery output power. More specifically, the power controller controls the converter passing power to P2, and controls the inverter passing power to P1+P2, thereby making it possible to control the first battery output power and the second battery output power to P1 and P2, respectively.

Figure 3:
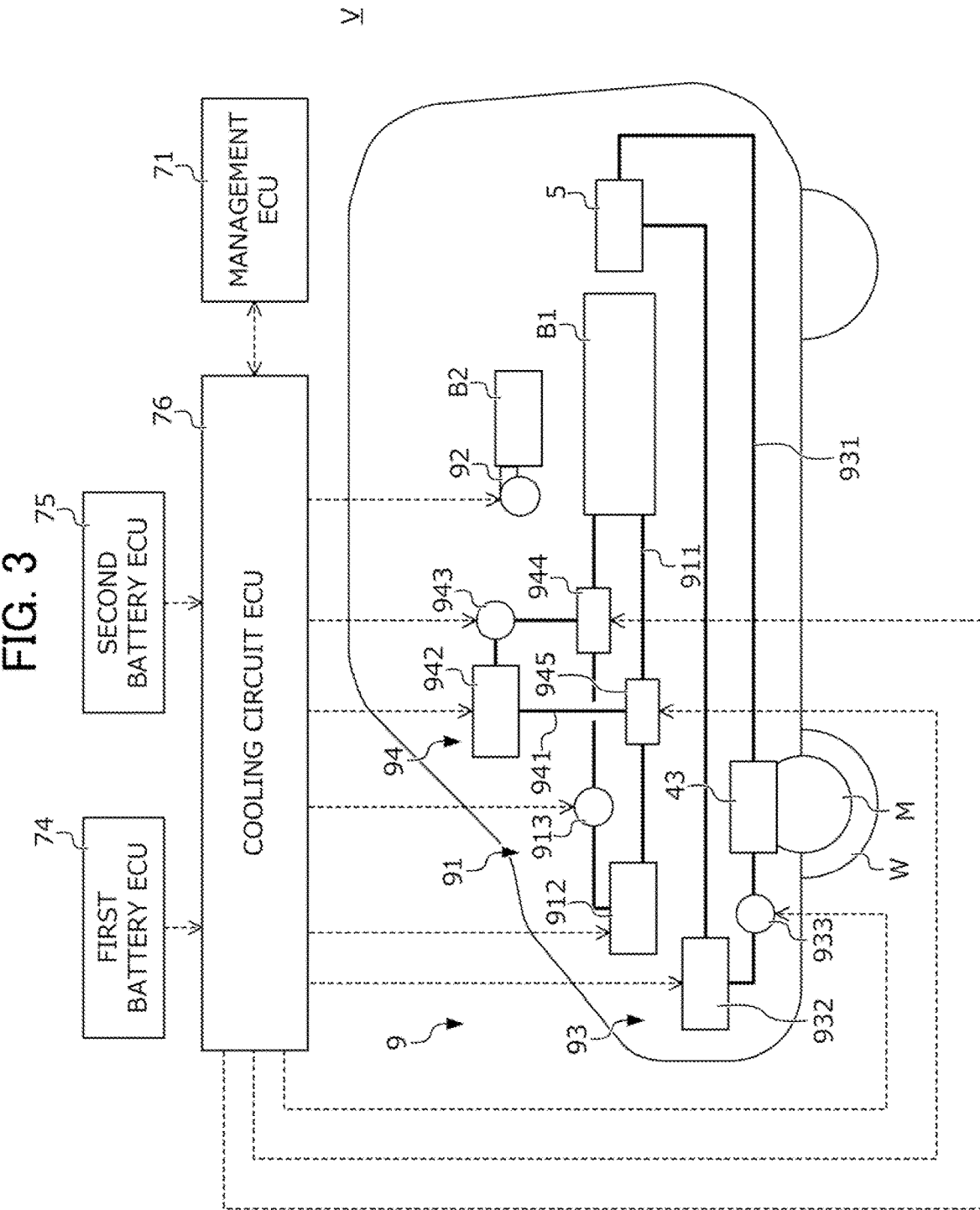
FIG. 3 is a diagram showing an example of a circuit configuration of a cooling circuit.

FIG. 3 is a diagram showing a circuit configuration of the cooling circuit 9. The cooling circuit 9 includes a first cooler 91 for cooling the first battery B1, a second cooler 92 for cooling the second batter B2, and a third cooler 93 for cooling the voltage converter 5 and the power converter 43.

The first cooler 91 includes a first cooling water circulating path 911 including a cooling water flow path formed in a battery case that houses the first battery B1, a first heat exchanger 912 and a first cooling water pump 913 provided on the first cooling water circulating path 911, and a heating device 94 connected to the first cooling water circulating path 911.

The first cooling water pump 913 rotates in response to a command inputted from the cooling circuit ECU 76, and circulates cooling water in the first cooling water circulating path 911. The first heat exchanger 912 promotes heat exchange between the cooling water circulating in the first cooling water circulating path 911 and outside air, thereby cooling the cooling water heated by the heat exchange with the first battery B1. The first heat exchanger 912 includes a radiator fan that rotates in response to a command inputted from the cooling circuit ECU 76.

The heating device 94 includes a bypass path 941 that connects an inlet and an outlet of the first heat exchanger 912 of the first cooling water circulating path 911 and bypasses the first heat exchanger 912, a heater 942 and a heating pump 943 provided on the bypass path 941, and three-way valves 944 and 945 at a connection portion between both ends of the bypass path 941 and the first cooling water circulating path 911.

The heating pump 943 rotates in response to a command inputted from the cooling circuit ECU 76, and circulates cooling water in the first cooling water circulating path 911 and the bypass path 941. The heater 942 generates heat by consuming electric power supplied from a battery (not shown), and raises the temperature of the cooling water flowing through the bypass path 941.

The three-way valves 944 and 945 open and close in response to a command from the cooling circuit ECU 76 to switch the flow path of the cooling water between the first heat exchanger 912 side and the heater 942 side. Therefore, the first cooler 91 has two functions: a cooling function of cooling the first battery B1 by circulation of the cooling water cooled by the first heat exchanger 912; and a heating function of heating the first battery B1 by circulation of the cooling water heated by the heater 942.

The cooling circuit ECU 76 controls a first cooling output of the first cooler 91 for the first battery B1 by operating the first heat exchanger 912, the first cooling water pump 913, the heater 942, the heating pump 943, and the three-way valves 944, 945, based on the first battery temperature transmitted from the first battery ECU 74, the detection value of a first cooling water temperature sensor (not shown) for detecting the temperature of the cooling water flowing through the first cooling water circulating path 911, the detection value of an outside air temperature sensor (not shown), a command from the management ECU 71, etc. Here, the first cooling output is a parameter that increases or decreases according to cooling performance provided on the first battery B1 by the first cooler 91, and is, for example, the rotation speed of the radiator fan provided in the first heat exchanger 912.

In addition, the cooling circuit ECU 76 calculates a first cooling remaining-capacity corresponding to the cooling margin of the first battery B1 by the first cooler 91, and transmits the first cooling remaining-capacity to the management ECU 71. More specifically, the cooling circuit ECU 76 calculates, as the first cooling remaining-capacity, a value obtained by subtracting the current first cooling output from a first maximum cooling output (for example, the maximum rotation speed of the radiator fan) corresponding to the maximum value of the first cooling output of the first cooler 91. In other words, the first cooling remaining-capacity increases or decreases according to the difference between the first maximum cooling output and the first cooling output. A specific procedure for controlling the first cooling output performed by the cooling circuit ECU 76 will be described later.

The second cooler 92 includes, for example, a cooling fan that supplies outside air into a battery case that houses the second battery B2. The second cooler 92 rotates in response to a command from the cooling circuit ECU 76, and supplies the outside air into the battery case of the second battery B2 to cool the second battery B2.

The cooling circuit ECU 76 controls a second cooling output of the second cooler 92 for the second battery B2 by operating the second cooler 92 based on the second battery temperature transmitted from the second battery ECU 75, the detection value of an outside air temperature sensor, and a command from the management ECU 71. Here, the second cooling output is a parameter that increases or decreases according to cooling performance provided on the second battery B2 by the second cooler 92, and is, for example, the rotation speed of the cooling fan of the second cooler 92.

In addition, the cooling circuit ECU 76 calculates a second cooling remaining-capacity corresponding to the cooling margin of the second battery B2 by the second cooler 92, and transmits the second cooling remaining-capacity to the management ECU 71. More specifically, the cooling circuit ECU 76 calculates, as the second cooling remaining-capacity, a value obtained by subtracting the current second cooling output from a second maximum cooling output (for example, the maximum rotation speed of the cooling fan) corresponding to the maximum value of the second cooling output of the second cooler 92. In other words, the second cooling remaining-capacity increases or decreases according to the difference between the second maximum cooling output and the second cooling output. A specific procedure for controlling the second cooling output performed by the cooling circuit ECU 76 will be described later.

The third cooler 93 includes a third cooling water circulating path 931 including a cooling water flow path formed in a housing in which the voltage converter 5 and the power converter 43 are installed, and a third heat exchanger 932 and a third cooling water pump 933 provided in the third cooling water circulating path 931.

The third cooling water pump 933 rotates in response to a command inputted from the cooling circuit ECU 76, and circulates cooling water in the third cooling water circulating path 931. The third heat exchanger 932 promotes heat exchange between the cooling water circulating in the third cooling water circulating path 931 and outside air, thereby cooling the cooling water heated by the heat exchange with the voltage converter 5 and the power converter 43. The third heat exchanger 932 includes a radiator fan that rotates in response to a command inputted from the cooling circuit ECU 76.

The cooling circuit ECU 76 operates the third heat exchanger 932 and the third cooling water pump 933 based on the detection value of a cooling water temperature sensor (not shown) and a command from the management ECU 71, and thereby controls the third cooling output corresponding to cooling performance provided on the voltage converter 5 and the power converter 43 by the third cooler 93.

In the present embodiment, as described above, the first cooler 91 for cooling the first battery B1 and the third cooler 93 for cooling the voltage converter 5, etc. are of a water cooling type in which the cooling is performed by heat exchange with the cooling water, and the second cooler 92 for cooling the second battery B2 having a smaller heat capacity than the first battery B1 is of an air cooling type in which the cooling is performed by heat exchange with the outside air; however, the present invention is not limited thereto. The first cooler 91 may be configured as the air cooling type, the second cooler 92 may be configured as the water cooling type, and the third cooler 93 may be configured as the air cooling type. In the present embodiment, the circulation flow path of the cooling water for cooling the first battery B1 and the circulation flow path of the cooling water for cooling the voltage converter 5 and the power converter 43 are configured as separate systems, but the present invention is not limited thereto. Both or either of the voltage converter 5 and the power converter 43 may be cooled by the cooling water for cooling the first battery B1.

Figure 4:
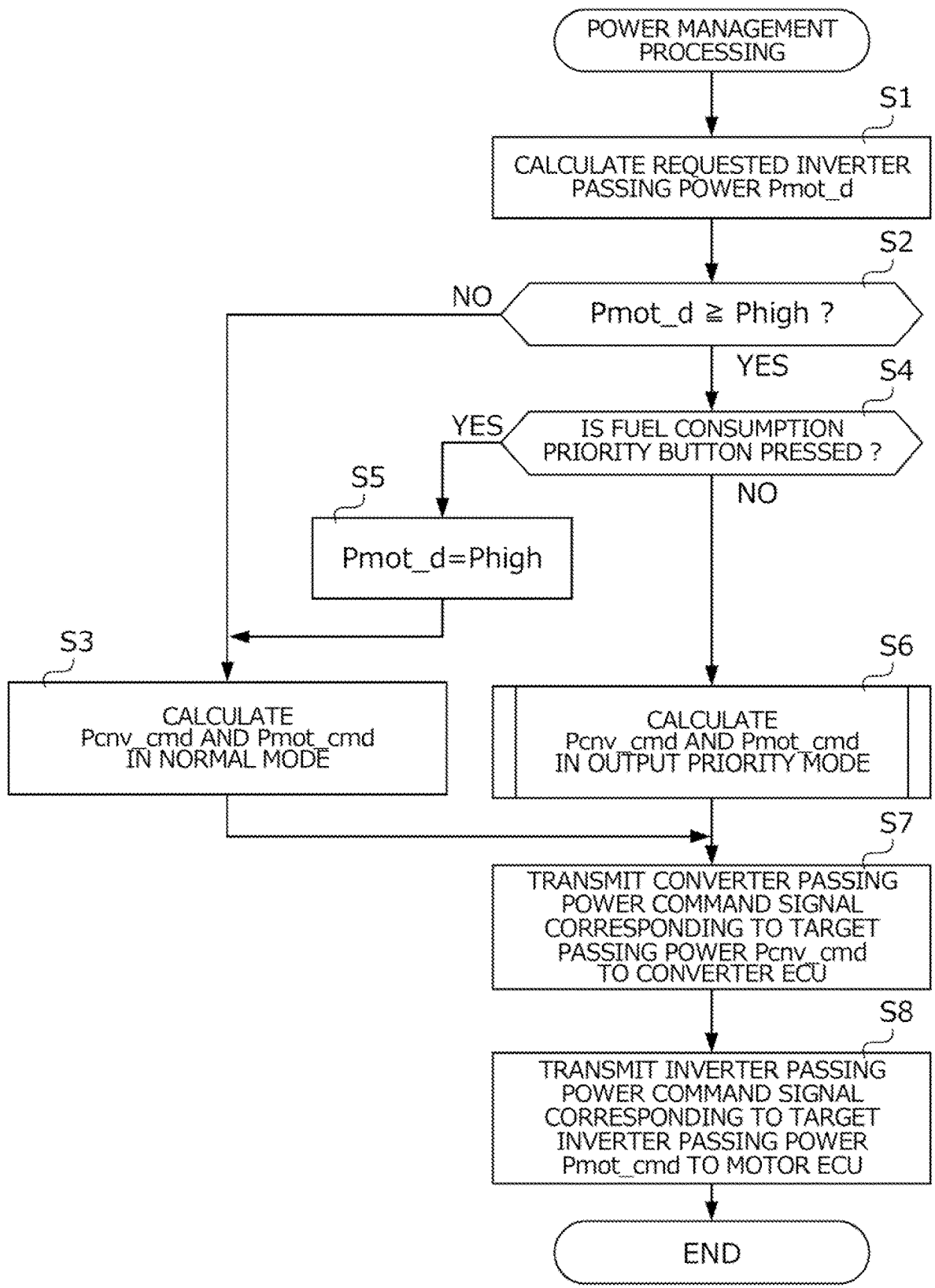
FIG. 4 is a flowchart showing a specific procedure of power management processing.

FIG. 4 is a flowchart showing a specific procedure of the power management processing. The power management processing is repeatedly executed in predetermined cycles in the management ECU 71 from the time when the driver turns on a start switch (not shown) to start operating the vehicle V and the power supply system 1 to the time when the driver then turns off the start switch to stop the operation of the vehicle V and the power supply system 1.

First, in Step S1, the management ECU 71 calculates a requested drive torque by the driver based on the operation amount of the pedals such as the accelerator pedal and brake pedal (see FIG. 1) by the driver, and converts the requested drive torque into power, thereby calculating a request for the inverter passing power in the power converter 43, that is, a requested inverter passing power Pmot_d corresponding to the requested output in the drive motor M, and then, proceeds to Step S2.

Next, in Step S2, the management ECU 71 determines whether the requested inverter passing power Pmot_d calculated in Step S1 is equal to or higher than a high output threshold value Phigh. When the determination result in Step S2 is NO, the management ECU 71 proceeds to Step S3; when the determination result is YES, the management ECU 71 proceeds to Step S4.

Next, in Step S3, the management ECU 71 calculates, in a normal mode, a target converter passing power Pcnv_cmd corresponding to the target for the converter passing power and a target inverter passing power Pmot_cmd corresponding to the target for the inverter passing power, and then, proceeds to Step S7. Here, in the normal mode, the management ECU 71 calculates the target converter passing power Pcnv_cmd and the target inverter passing power Pmot_cmd so that the power is inputted and outputted from the first battery B1 and the second battery B2 at the target ratio calculated based on a predetermined algorithm. Further, the management ECU 71 limits the target inverter passing power Pmot_cmd to the above-described high output threshold value Phigh or less in the normal mode.

Next, in Step S7, the management ECU 71 generates a converter passing power command signal corresponding to the target converter passing power Pcnv_cmd and transmits the generated signal to the converter ECU 73, and then, proceeds to Step S8. Thus, the power corresponding to the target converter passing power Pcnv_cmd is charged and discharged from the second battery 32.

Next, in Step S8, the management ECU 71 generates an inverter passing power command signal corresponding to the target inverter passing power Pmot_cmd and transmits the generated signal to the motor ECU 72, and the processing of FIG. 4 ends. Thus, the power corresponding to the target inverter passing power Pmot_cmd flows between the first power circuit 2 and the drive motor M. As a result, the power obtained by subtracting the target converter passing power Pcnv_cmd from the target inverter passing power Pmot_cmd is charged and discharged from the first battery B1.

Next, in Step S4, the management ECU 71 determines whether a fuel consumption priority button (not shown) is pressed by the driver, in other words, whether the driver gives an instruction to allow an execution in an output priority mode to be described later. When the determination result in Step S4 is YES, the management ECU 71 proceeds to Step S5, performs limit processing for limiting the requested inverter passing power Pmot_d, which has been calculated in Step S1, to less than a predetermined value. Thereafter, the management ECU 71 proceeds to Step S3. In the limit processing in Step S5, the management ECU 71 sets the high output threshold value Phigh as the requested inverter passing power Pmot_d, thereby limiting the requested inverter passing power Pmot_d.

When the determination result in Step S4 is NO, the management ECU 71 proceeds to Step S6. In Step S6, as will be described with reference to FIGS. 5A and 5B, the management ECU 71 calculates the target converter passing power Pcnv_cmd and the target inverter passing power Pmot_cmd in the output priority mode in which the inverter passing power larger than that in the normal mode described above is allowed, and then, proceeds to Step S7.

Figure 5A:
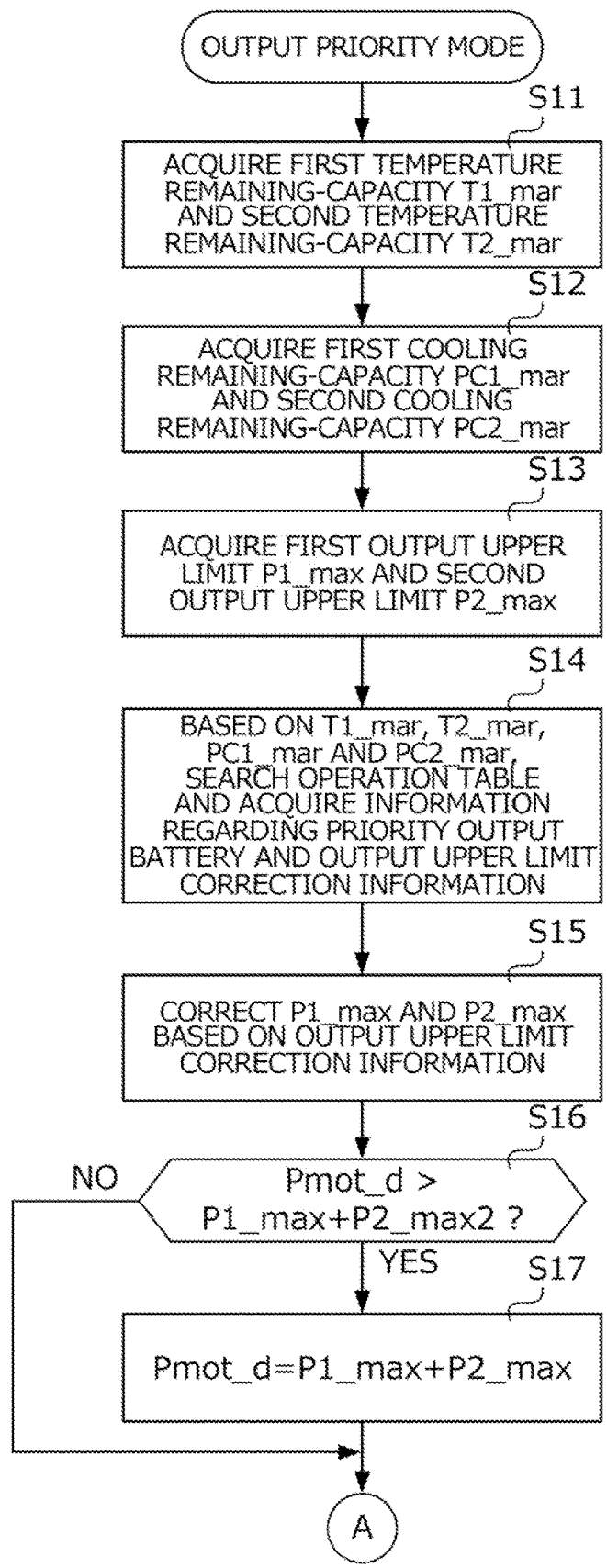
FIG. 5A is a first flowchart showing a procedure for calculating a target converter passing power and a target inverter passing power in an output priority mode.
Figure 5B:
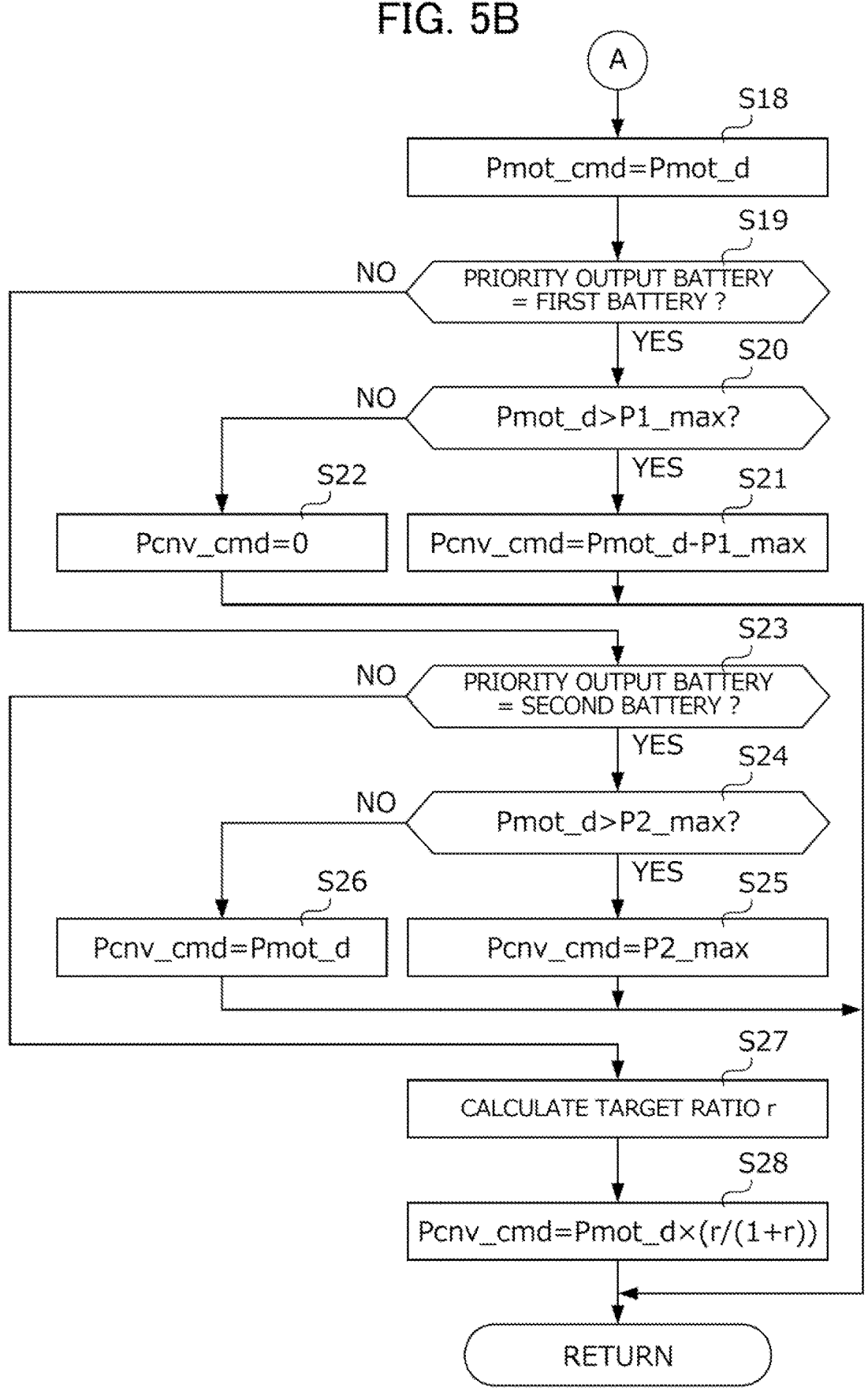
FIG. 5B is a second flowchart showing a procedure for calculating a target converter passing power and a target inverter passing power in an output priority mode.

FIGS. 5A and 5B are flowcharts showing a procedure for calculating the target converter passing power Pcnv_cmd and the target inverter passing power Pmot_cmd in the output priority mode.

First, in Step S11, the management ECU 71 acquires a first temperature remaining-capacity T1_mar and a second temperature remaining-capacity T2_mar from the first battery ECU 74 and the second battery ECU 75, respectively, and then, proceeds to Step S12.

Next, in Step S12, the management ECU 71 acquires a first battery cooling remaining-capacity PC1_mar and a second battery cooling remaining-capacity PC2_mar from the cooling circuit ECU 76, and then, proceeds to Step S13.

Next, in Step S13, the management ECU 71 acquires a first output upper limit P1_max and a second output upper limit P2_max from the first battery ECU 74 and the second battery ECU 75, respectively, and then, proceeds to Step S14.

Next, in Step S14, the management ECU 71 searches an operation table shown in FIG. 6, based on the first temperature remaining-capacity T1_mar, the second temperature remaining-capacity T2_mar, the first battery cooling remaining-capacity PC1_mar, and the second battery cooling remaining-capacity PC2_mar which have been acquired, thereby acquiring information regarding the priority output battery and output upper limit correction information.

FIG. 6 shows an example of the operation table for determining the output and the cooling mode of the battery based on the temperature remaining-capacity and the cooling remaining-capacity.

In FIG. 6, "with the temperature remaining-capacity" means that the first temperature remaining-capacity T1_mar is equal to or more than a predetermined first temperature remaining-capacity threshold value or the second temperature remaining-capacity T2_mar is equal to or more than a predetermined second temperature remaining-capacity threshold value. "No temperature remaining-capacity" means that the first temperature remaining-capacity T1_mar is less than the first temperature remaining-capacity threshold value or the second temperature remaining-capacity T2_mar is less than the second temperature remaining-capacity threshold value. "With the cooling remaining-capacity" means that the first cooling remaining-capacity PC1_mar is equal to or more than the predetermined first cooling remaining-capacity threshold value or the second cooling remaining-capacity PC2_mar is equal to or more than the predetermined second cooling remaining-capacity threshold value. Further, "no cooling remaining-capacity" means that the first cooling remaining-capacity PC1_mar is less than the first cooling remaining-capacity threshold value or the second cooling remaining-capacity PC2_mar is less than the second cooling remaining-capacity threshold value.

Hereinafter, the case where the first temperature remaining-capacity T1_mar is equal to or more than the first temperature remaining-capacity threshold value is also referred to as a case where the first battery B1 has the temperature remaining-capacity, and the case where the first temperature remaining-capacity T1_mar is less than the first temperature remaining-capacity threshold value is also referred to as a case where the first battery B1 has no temperature remaining-capacity. The case where the second temperature remaining-capacity T2_mar is equal to or more than the second temperature remaining-capacity threshold value is also referred to as a case where the second battery 82 has the temperature remaining-capacity, and the case where the second temperature remaining-capacity T2_mar is less than the second temperature remaining-capacity threshold value is also referred to as a case where the second battery B2 has no temperature remaining-capacity. The case where the first cooling remaining-capacity PC1_mar is equal to or more than the first cooling remaining-capacity threshold value is also referred to as a case where the first battery B1 has the cooling remaining-capacity, and the case where the first cooling remaining-capacity PC1_mar is less than the first cooling remaining-capacity threshold value is also referred to as a case where the first battery B1 has no cooling remaining-capacity. In addition, the case where the second cooling remaining-capacity PC2_mar is equal to or more than the second cooling remaining-capacity threshold value is also referred to as a case where the second battery B2 has the cooling remaining-capacity, and the case where the second cooling remaining-capacity PC2_mar is less than the second cooling remaining-capacity threshold value is also referred to as a case where the second battery B2 has no cooling remaining-capacity.

The priority output battery refers to a battery that is preferentially caused to output power up to its output upper limit. As will be described below, when the priority output battery is the first battery B1, the first battery B1 is preferentially caused to output the power up to the first output upper limit P1_max, and when the priority output battery is the second battery B2, the second battery B2 is preferentially caused to output the power up to the second output upper limit P2_max. Further, when there is no priority output battery, a ratio between the output power of the first battery B1 and the output power of the second battery B2 is controlled so that the ratio becomes equal to a predetermined target ratio, as will be described below.

According to the example of the operation table shown in FIG. 6, when the first battery B1 has the temperature remaining-capacity and the cooling remaining-capacity, the first battery B1 is determined as a priority output battery, and when the second battery B2 has the temperature remaining-capacity and the cooling remaining-capacity, the second battery B2 is basically determined as a priority output battery. Further, when both of the first battery B1 and the second battery B2 have the temperature remaining-capacity and the cooling remaining-capacity, the first battery B1 having a large heat capacity and hardly rising in temperature is determined as a priority output battery.

In the operation table shown in FIG. 6, a "first output upper limit: DOWN" indicates that the first output upper limit P1_max of the first battery B1 is corrected downward, and a "second output upper limit: DOWN" indicates that the second output upper limit. P2_max of the second battery 82 is corrected downward. Therefore, according to the example of the operation table shown in FIG. 6, when the first battery B1 has neither the temperature remaining-capacity nor the cooling remaining-capacity, the first output upper limit P1_max is corrected downward, and when the second battery B2 has neither the temperature remaining-capacity nor the cooling remaining-capacity, the second output upper limit P2_max is corrected downward.

Returning back to FIG. 5A, in Step S15, the management ECU 71 corrects the first output upper limit P1_max and the second output upper limit P2_max based on the output upper limit correction information acquired in Step S14, and then, proceeds to Step S16.

Next, in Step S16, the management ECU 71 determines whether the requested inverter passing power Pmot_d acquired in Step S1 is larger than the sum of the first output upper limit P1_max and the second output upper limit P2_max. When the determination result in Step S16 is YES, the management ECU 71 proceeds to Step S17, performs the limit processing for limiting the requested inverter passing power Pmot_d to less than a predetermined value, and then, proceeds to Step S18. In the limit processing of Step S17, the management ECU 71 sets the sum of the first output upper limit P1_max and the second output upper limit P2_max as the requested inverter passing power Pmot_d, for example, thereby limiting the requested inverter passing power Pmot_d. When the determination result in Step S16 is NO, the management ECU 71 proceeds to Step S18, without executing the limit processing described above.

Next, in Step S18, the management ECU 71 sets the requested inverter passing power Pmot_d as the target inverter passing power Pmot_cmd, and then, proceeds to Step S19.

Next, in Step S19, the management ECU 71 determines whether the priority output battery acquired in Step S14 is the first battery B1. When the determination result in Step 319 is YES, the management ECU 71 proceeds to Step S20; when the determination result is NO, the management ECU 71 proceeds to Step S23.

Next, in Step S20, the management ECU 71 determines whether the requested inverter passing power Pmot_d is larger than the first output upper limit P1_max. When the determination result in Step S20 is YES, the management ECU 71 proceeds to Step S21, sets the value obtained by subtracting the first output upper limit P1_max from the requested inverter passing power Pmot_d as the target converter passing power Pcnv_cmd, and then, proceeds to Step S7 in FIG. 4. When the determination result in Step S20 is NO, the management ECU 71 proceeds to Step S22, sets a value of 0 as the target converter passing power Pcnv_cmd, and then, proceeds to Step S7 in FIG. 4. When the first battery B1 is set as the priority output battery as described above, the first battery B1 is caused to output the power up to the first output upper limit P1_max, in preference to the second battery B2.

Next, in Step S23, the management ECU 71 determines whether the priority output battery acquired in Step S14 is the second battery B2. When the determination result in Step S23 is YES, the management ECU 71 proceeds to Step S24; when the determination result is NO, the management ECU 71 proceeds to Step S27.

Next, in Step S24, the management ECU 71 determines whether the requested inverter passing power Pmot_d is larger than the second output upper limit P2_max. When the determination result in Step S24 is YES, the management ECU 71 proceeds to Step S25, sets the second output upper limit P2_max as the target converter passing power Pcnv_cmd, and then, proceeds to Step S7 in FIG. 4. When the determination result in Step S24 is NO, the management ECU 71 proceeds to Step S26, sets the requested inverter passing power Pmot_d as the target converter passing power Pcnv_cmd, and then, proceeds to Step S7 in FIG. 4. When the second battery B2 is set as the priority output battery as described above, the second battery B2 is caused to output the power up to the second output upper limit P2_max, in preference to the first battery B1.

Next, in Step 327, the management ECU 71 calculates a target ratio r corresponding to a target with respect to a ratio of the output power of the second battery B2 to the output power of the first battery B1, and then, proceeds to Step S28. The management ECU 71 calculates the target ratio r such that the output power of the batteries B1 and B2 do not exceed the output upper limits P1_max and P2_max, respectively, based on the first SOC, the second SOC, the first output upper limit P1_max, and the second output upper limit P2_max, for example.

Next, in Step S28, the management ECU 71 calculates a target converter passing power Pcnv_cmd based on the following equation such that the first battery B1 and the second battery B2 output the respective power at the target ratio r, and then, proceeds to Step S7 in FIG. 4. As described above, when neither the first battery B1 nor the second battery B2 is the priority output battery, the ratio of the output power of the first battery B1 and the output power of the second battery B2 is controlled to be the target ratio r. Pcnv_cmd=Pmot_d×(r/(1+r))

As described above, when an operation mode is the output priority mode, the management ECU 71 controls the output power of the first battery B1 and the output power of the second battery B2 based on the requested inverter passing power Pmot_d, the first cooling remaining-capacity PC1_mar, the second cooling remaining-capacity PC2_mar, the first temperature remaining-capacity T1_mar, and the second temperature remaining-capacity T2_mar.

As described with reference to FIG. 6, the management ECU 71 sets the first battery B1 as the priority output battery when the first battery B1 has the temperature remaining-capacity and the cooling remaining-capacity, whereby the first battery B1 is caused to output power up to the first output upper limit in preference to the second battery B2. Accordingly, the management ECU 71 increases the output power of the first battery B1 when the first battery B1 has the temperature remaining-capacity and the cooling remaining-capacity, as compared with the case where the first battery 31 has no temperature remaining-capacity or where the first battery B1 has no cooling remaining-capacity.

Further, when the second battery B2 has the temperature remaining-capacity and the cooling remaining-capacity, the management ECU 71 sets basically the second battery B2 as the priority output battery, and thus allows the second battery B2 to output power up to the second output upper limit in preference to the first battery B1. Therefore, management ECU 71 increases basically the output power of the second battery B2 when the second battery B2 has the temperature remaining-capacity and the cooling remaining-capacity, as compared with the case where the second battery B2 has no temperature remaining-capacity or the second battery B2 has no cooling remaining-capacity.

Further, when both of the first battery B1 and the second battery B2 have the temperature remaining-capacity and the cooling remaining-capacity, the management ECU 71 sets the first battery B1 having a large heat: capacity as the priority output battery, and thus allows the first battery B1 to output power up to the first output upper limit in preference to the second battery B2.

Further, as described with reference to FIG. 6, the management ECU 71 corrects the first output upper limit P1_max downward when the first battery B1 has no temperature remaining-capacity and no cooling remaining-capacity. Therefore, the management ECU 71 reduces the output power of the first battery B1 when the first battery B1 has no temperature remaining-capacity and no cooling remaining-capacity, as compared with the case where the first battery B1 has the temperature remaining-capacity or the first battery B1 has the cooling remaining-capacity.

Further, the management ECU 71 corrects the second output upper limit P2_max downward when the second battery B2 has no temperature remaining-capacity and no cooling remaining-capacity. Therefore, the management ECU 71 reduces the output power of the second battery B2 when the second battery B2 has no temperature remaining-capacity and no cooling remaining-capacity, as compared with the case where the second battery B2 has the temperature remaining-capacity or the second battery B2 has the cooling remaining-capacity.

Returning back to FIG. 3, a procedure for controlling the first cooling output and the second cooling output by the cooling circuit ECU 76 will be described.

As described with reference to FIG. 4, when the operation mode in the power management processing is the output priority mode (see Step S6 in FIG. 4), the larger inverter passing power is allowed compared with when the operation mode is the normal mode (see Step S3 in FIG. 4). For this reason, the amount of heat generated by the first battery B1 and the second battery B2 tends to be larger when the operation mode is the output priority mode than when the operation mode is the normal mode. For this reason, the cooling circuit ECU 76 changes the control algorithms of the first cooling output and the second cooling output according to the operation mode in the power management processing.

First, a case where the operation mode is the normal mode will be described. When the operation mode is the normal mode, the cooling circuit ECU 76 calculates a first control input (for example, a duty ratio of the motor for driving the radiator fan) to the first cooler 91, based on a known first basic cooling algorithm using the first battery temperature transmitted from the first battery ECU 74, the detection value of the first cooling water temperature sensor, and the detection value of the outside air temperature sensor, such that the first battery temperature is at the predetermined first target temperature, and controls the first cooling output by inputting the first control input to the first cooler 91.

In addition, when the operation mode is the normal mode, the cooling circuit ECU 76 calculates a second control input (for example, a duty ratio of the motor for driving the cooling fan) to the second cooler 92, based on a known second basic cooling algorithm using the second battery temperature transmitted from the second battery ECU 75 and the detection value of the outside air temperature sensor, such that the second battery temperature is at the predetermined second target temperature, and controls the second cooling output by inputting the second control input to the second cooler 92.

Next, a case where the operation mode is the output priority mode will be described. When the operation mode is the output priority mode, the cooling circuit ECU 76 controls the first cooling output based on the first basic cooling algorithm, the first temperature remaining-capacity T1_mar, and the first cooling remaining-capacity PC1_mar which are described above. More specifically, first, the cooling circuit ECU 76 searches an operation map shown in FIG. 6 based on the first temperature remaining-capacity T1_mar and the first cooling remaining-capacity PC1_mar, thereby acquiring information regarding a first cooling mode of the first battery B1. According to the example of the operation map shown in FIG. 6, when the first battery B1 has the cooling remaining-capacity, the first cooling mode is "active cooling". Further, when the first battery B1 has no cooling remaining-capacity, the first cooling mode is "cooling max".

Next, the cooling circuit ECU 76 corrects the first control input calculated based on the first basic cooling algorithm described above according to the first cooling mode information acquired from the operation map in FIG. 6, and controls the first cooling output by inputting the corrected first control input to the first cooler 91. When the first cooling mode is the "active cooling", the cooling circuit ECU 76 adds the correction value calculated based on the first temperature remaining-capacity T1_mar to the first control input calculated based on the first basic cooling algorithm, thereby correcting the first control input to cooling performance improvement. Therefore, when the operation mode is the output priority mode and the first cooling mode is the "active cooling", the cooling circuit ECU 76 increases the first cooling output compared with the case where the operation mode is the normal mode. Further, when the first cooling mode is the "cooling max", the cooling circuit ECU 76 sets the first control input as the maximum value regardless of the calculation result of the first control input based on the first basic cooling algorithm. Therefore, when the operation mode is the output priority mode and the first cooling mode is the "cooling max", the cooling circuit ECU 76 increases the first cooling output to the first maximum cooling output.

Further, when the operation mode is the output priority mode, the cooling circuit ECU 76 controls the second cooling output based on the second basic cooling algorithm, the second temperature remaining-capacity T2_mar, and the second cooling remaining-capacity PC2_mar which are described above. More specifically, first, the cooling circuit ECU 76 searches for the operation map shown in FIG. 6 based on the second temperature remaining-capacity T2_mar and the second cooling remaining-capacity PC2_mar, thereby acquiring the information regarding the second cooling mode of the second battery B2. According to the example of the operation map shown in FIG. 6, when the second battery B2 has the cooling remaining-capacity, the second cooling mode is the "active cooling". Further, when the second battery B2 has no cooling remaining-capacity, the second cooling mode is the "cooling max".

Next, cooling circuit ECU 76 corrects the second control input calculated based on the second basic cooling algorithm described above according to the second cooling mode information acquired from the operation map shown in FIG. 6, and controls the second cooling output by inputting the corrected second control input to the second cooler 92. When the second cooling mode is the "active cooling", the cooling circuit ECU 76 adds the correction value calculated based on the second temperature remaining-capacity T2_mar to the second control input calculated based on the second basic cooling algorithm, thereby correcting the second control input to the cooling performance improvement. Therefore, when the operation mode is the output priority mode and the second cooling mode is the "active cooling", the cooling circuit ECU 76 increases the second cooling output compared with the case where the operation mode is the normal mode. Further, when the second cooling mode is the "cooling max", the cooling circuit ECU 76 sets the second control input as the maximum value regardless of the calculation result of the second control input based on the second basic cooling algorithm. Therefore, when the operation mode is the output priority mode and the second cooling mode is the "cooling max", the cooling circuit ECU 76 increases the second cooling output to the second maximum cooling output.

The power supply system 1 according to the present embodiment exerts the following effects.

(1) The management ECU 71 controls the output power of the batteries B1 and B2 in the normal mode or the output priority mode that allows a larger output than the normal mode, the cooling circuit ECU 76 controls the first and second cooling outputs by the coolers 91 and 92, and the cooling circuit ECU 76 acquires the cooling remaining-capacities PC1_mar and PC2_mar that increase and decrease according to the difference between the first and second maximum cooling outputs and the first and second cooling outputs of the coolers 91 and 92. Further, when the operation mode is the output priority mode and the first battery B1 has the cooling remaining-capacity, the cooling circuit ECU 76 increases the first cooling output as compared with the case where the operation mode is the normal mode, and in the case where the operation mode is the output priority mode and the second battery B2 has the cooling remaining-capacity, the cooling circuit ECU 76 increases the second cooling output as compared with the case where the operation mode is the normal mode. Here, when the operation mode is the output priority mode, the output of each of the batteries B1 and B2 tends to be large, and therefore the amount of heat generated tends to increase. Therefore, in the power supply system 1, when each of the batteries B1 and B2 has the cooling remaining-capacity, that is, when there is room for increasing the cooling output, the cooling output is increased in anticipation of an increase in the amount of heat generated by each of the batteries B1 and B2. Thus, in the output priority mode, each of the batteries B1 and B2 can be maintained at an appropriate temperature such that the output can be increased promptly in response to the request. Further, thereby, it is possible to reduce the situation where the temperature of each of the batteries B1 and B2 rises excessively and the output thereof is limited.

(2) The management ECU 71 controls the output power of the batteries B1 and B2 based on the cooling remaining-capacities PC1_mar and PC2_mar and the temperature remaining-capacities T1_mar and T2_mar. Thus, the output power of the batteries B1 and B2 can be controlled to an appropriate size in anticipation of room for an increase of the cooling output of each of the coolers 91 and 92.

(3) When the operation mode is the output mode and each of the batteries B1 and B2 has the cooling remaining-capacity, the cooling circuit ECU 76 increases the cooling output of each of the coolers 91 and 92 as compared with the case where the operation mode is the normal mode as described above. Further, when each of the batteries B1 and B2 has the temperature remaining-capacity and the cooling remaining-capacity, the management ECU 71 increases the output power of each of the batteries B1 and B2 compared with the case where each of the batteries B1 and B2 has no temperature remaining-capacity or no cooling remaining-capacity. Thus, it is possible to inhibit an excessive temperature rise of each of the batteries B1 and B2 while increasing the output of each of the batteries B1 and B2.

(4) When each of the batteries B1 and B2 has no cooling remaining-capacity, the cooling circuit ECU 76 increases the cooling output of each of the coolers 91 and 92 to the maximum cooling output thereof, and when each of the batteries B1 and B2 has no temperature remaining-capacity and no cooling remaining-capacity, the management ECU 71 reduces the output power of each of the batteries B1 and B2 compared with the case where each of the batteries B1 and B2 has no temperature remaining-capacity or no cooling remaining-capacity. Thereby, the temperature drop of each of the batteries B1 and B2 can be promoted such that the output power of each of the batteries B1 and B2 can be increased again.

(5) The battery ECUs 74 and 75 calculate the temperature remaining-capacities T1_mar and T2_mar, respectively, based on the temperature difference between the upper limit temperatures and the current temperatures of the batteries B1 and B2 and the heat capacities of the batteries B1 and B2. Thus, the management ECU 71 can control the output power of each of the batteries B1 and B2 to an appropriate size while preventing the excessive temperature rise of each of the batteries B1 and B2 in consideration of the heat capacity of each of the batteries B1 and B2.

Second Embodiment

Next, a power supply system according to a second embodiment of the present invention will be described with reference to the drawings. The power supply system according to the present embodiment is different from the power supply system 1 according to the first embodiment in terms of the procedure for calculating the first temperature remaining-capacity T1_mar and the second temperature remaining-capacity T2_mar and the configuration of the operation table.

In the power supply system 1 according to the first embodiment, the first battery ECU 74 calculates the first temperature remaining-capacity by subtracting the first battery temperature from the first battery upper limit temperature, and the second battery ECU 75 calculates the second temperature remaining-capacity by subtracting the second battery temperature from the second battery upper limit temperature.

On the other hand, in the power supply system according to the present embodiment, the first battery ECU calculates the first temperature remaining-capacity by multiplying the first temperature difference, which is obtained by subtracting the first battery temperature from the first battery upper limit temperature, by a coefficient increasing or decreasing depending on the first heat capacity of the first battery B1. In addition, the second battery ECU calculates the second temperature remaining-capacity by multiplying the second temperature difference, which is obtained by subtracting the second battery temperature from the second battery upper limit temperature, by a coefficient increasing or decreasing depending on the second heat capacity of the second battery B2. In other words, the temperature remaining-capacity of each of the batteries B1 and B2 in the power supply system according to the present embodiment is corrected to a large value as each of the heat capacities is larger.

FIG. 7 shows an example of an operation table that is referred to in the power supply system according to the present embodiment. The operation table shown in FIG. 7 is different from the operation table shown in FIG. 6 in terms of a method of determining the priority output battery in the case where both of the first battery B1 and the second battery B2 have not only the temperature remaining-capacity but also the cooling remaining-capacity.

When both of the first battery B1 and the second battery B2 have not only the temperature remaining-capacity but also cooling remaining-capacity, the management ECU determines, as a priority output battery, the battery having either larger one of the first and second temperature remaining-capacities calculated in consideration of the heat capacity as described above. More specifically, the management ECU determines the first battery B1 as the priority output battery when the first temperature remaining-capacity is larger than the second temperature remaining-capacity, and determines the second battery B2 as the priority output battery when the second temperature remaining-capacity is larger than the first temperature remaining-capacity.

The power supply system 1 according to the present embodiment exerts the following effects.

(6) When both of the first battery B1 and the second battery B2 have not only the temperature remaining-capacity but also the cooling remaining-capacity, the management ECU preferentially causes the battery to output power, the battery having either larger one of the temperature remaining-capacities T1_mar and T2_mar calculated in consideration of the heat capacity as described above. Thereby, it is possible to control the output power of each of the batteries B1 and B2 to an appropriate size while preventing an excessive temperature rise of each of the batteries B1 and B2.

(7) When both of the first battery B1 and the second battery B2 have not only the temperature remaining-capacity but also the cooling remaining-capacity, the management ECU preferentially causes the first battery B1 having a relatively large heat capacity to output power in preference to the second battery B2 having a relatively small heat capacity. Thereby, it is possible to control the output power of each of the batteries B1 and B2 to an appropriate size while preventing an excessive temperature rise of each of the batteries B1 and B2.

Although an embodiment of the present invention has been described above, the present invention is not limited thereto. The configurations of detailed parts may be modified as appropriate within the scope of the gist of the present invention.

What is claimed is:

1. A power supply system comprising:
   a first electrical storage device;
   a second electrical storage device;
   a load circuit including a rotary electrical machine;
   a power circuit that connects the first and second electrical storage devices to the load circuit;
   a power controller that controls a first output power of the first electrical storage device and a second output power of the second electrical storage device in a normal mode or an output priority mode that allows an output, which is larger than that in the normal mode, from the power circuit to the load circuit;
   a first cooler that cools the first electrical storage device;
   a second cooler that cools the second electrical storage device; and
   a cooling output controller that controls a first cooling output of the first cooler and a second cooling output of the second cooler,
   the power supply system further comprising a cooling remaining-capacity acquirer that acquires a first cooling remaining-capacity increasing or decreasing depending on a difference between a first maximum cooling output and the first cooling output of the first cooler and a second cooling remaining-capacity increasing or decreasing depending on a difference between a second maximum cooling output and the second cooling output of the second cooler,
   the cooling output controller being configured such that:
   in a case where an operation mode of the power controller is the output priority mode and the first cooling remaining-capacity is equal to or more than a first cooling remaining-capacity threshold value, the cooling output controller increases the first cooling output as compared with a case where the operation mode is the normal mode, and
   in a case where the operation mode is the output priority mode and the second cooling remaining-capacity is equal to or more than a second cooling remaining-capacity threshold value, the cooling output controller increases the second cooling output as compared with a case where the operation mode is the normal mode.

2. The power supply system according to claim 1, further comprising:
   a temperature acquirer that acquires a first temperature of the first electrical storage device and a second temperature of the second electrical storage device; and
   a temperature remaining-capacity acquirer that acquires a first temperature remaining-capacity increasing or decreasing depending on a difference between a first upper limit temperature and the first temperature of the first electrical storage device and a second temperature remaining-capacity increasing or decreasing depending on a difference between a second upper limit temperature and the second temperature of the second electrical storage device,
   wherein the power controller controls the first output power and the second output power based on the first and second cooling remaining-capacities and the first and second temperature remaining-capacities.

3. The power supply system according to claim 2,
   wherein in a case where the first cooling remaining-capacity is equal to or more than the first cooling remaining-capacity threshold value and the first temperature remaining-capacity is equal to or more than a first temperature remaining-capacity threshold value, the power controller increases the first output power as compared with a case where the first cooling remaining-capacity or the first temperature remaining-capacity is less than the first cooling remaining-capacity threshold value or the first temperature remaining-capacity threshold value, and
   wherein in a case where the second cooling remaining-capacity is equal to or more than the second cooling remaining-capacity threshold value and the second temperature remaining-capacity is equal to or more than a second temperature remaining-capacity threshold value, the power controller increases the second output power as compared with a case where the second cooling remaining-capacity or the second temperature remaining-capacity is less than the second cooling remaining-capacity threshold value or the second temperature remaining-capacity threshold value.

4. The power supply system according to claim 3,
   wherein the cooling output controller increases the first cooling output to the first maximum cooling output in a case where the first cooling remaining-capacity is less than the first cooling remaining-capacity threshold value,
   wherein the cooling output controller increases the second cooling output to the second maximum cooling output in a case where the second cooling remaining-capacity is less than the second cooling remaining-capacity threshold value,
   wherein in a case where the first cooling remaining-capacity is less than the first cooling remaining-capacity threshold value and the first temperature remaining-capacity is less than the first temperature remaining-capacity threshold value, the power controller reduces the first output power as compared with the case where the first cooling remaining-capacity or the first temperature remaining-capacity is equal to or more than the first cooling remaining-capacity threshold value or the first temperature remaining-capacity threshold value, and
   wherein in a case where the second cooling remaining-capacity is less than the second cooling remaining-capacity threshold value and the second temperature remaining-capacity is less than the second temperature remaining-capacity threshold value, the power controller reduces the second output power as compared with the case where the second cooling remaining-capacity or the second temperature remaining-capacity is equal to or more than the second cooling remaining-capacity threshold value or the second temperature remaining-capacity threshold value.

5. The power supply system according to claim 4,
   wherein the temperature remaining-capacity acquirer calculates the first temperature remaining-capacity based on a first temperature difference between the first upper limit temperature and the first temperature and a first heat capacity of the first electrical storage device, and calculates the second temperature remaining-capacity based on a second temperature difference between the second upper limit temperature and the second temperature and a second heat capacity of the second electrical storage device.

6. The power supply system according to claim 5, wherein the power controller preferentially causes the first or second electrical storage device having either larger one of the first temperature remaining-capacity and the second temperature remaining-capacity to output power in a case where the first and second cooling remaining-capacities are equal to or more than the first and second cooling remaining-capacity threshold values, respectively, and the first and second temperature remaining-capacities are equal to or more than the first and second temperature remaining-capacity threshold values, respectively.

7. The power supply system according to claim 4, wherein the first electrical storage device has a larger heat capacity than the second electrical storage device, and wherein the power controller causes the first electrical storage device to output power in preference to the second electrical storage device in a case where the first and second cooling remaining-capacities are equal to or more than the first and second cooling remaining-capacity threshold values, respectively, and the first and second temperature remaining-capacities are equal to or more than the first and second temperature remaining-capacity threshold values, respectively.

8. The power supply system according to claim 3, wherein the temperature remaining-capacity acquirer calculates the first temperature remaining-capacity based on a first temperature difference between the first upper limit temperature and the first temperature and a first heat capacity of the first electrical storage device, and calculates the second temperature remaining-capacity based on a second temperature difference between the second upper limit temperature and the second temperature and a second heat capacity of the second electrical storage device.

9. The power supply system according to claim 8, wherein the power controller preferentially causes the first or second electrical storage device having either larger one of the first temperature remaining-capacity and the second temperature remaining-capacity to output power in a case where the first and second cooling remaining-capacities are equal to or more than the first and second cooling remaining-capacity threshold values, respectively, and the first and second temperature remaining-capacities are equal to or more than the first and second temperature remaining-capacity threshold values, respectively.

10. The power supply system according to claim 3, wherein the first electrical storage device has a larger heat capacity than the second electrical storage device, and wherein the power controller causes the first electrical storage device to output power in preference to the second electrical storage device, in a case where the first and second cooling remaining-capacities are equal to or more than the first and second cooling remaining-capacity threshold values, respectively, and the first and second temperature remaining-capacities are equal to or more than the first and second temperature remaining-capacity threshold values, respectively.

\* \* \* \* \*